US011462983B2

(12) United States Patent
Shlakhetski et al.

(10) Patent No.: US 11,462,983 B2
(45) Date of Patent: Oct. 4, 2022

(54) ELECTRIC MOTOR

(71) Applicant: INTELLITECH PTY LTD, Malvern (AU)

(72) Inventors: Victor Shlakhetski, Ashkelon (IL); Alexander Mostovoy, Ashkelon (IL)

(73) Assignee: INTELLITECH PTY LTD

( * ) Notice: Subject to any disclaimer, the term of this patent is extended or adjusted under 35 U.S.C. 154(b) by 0 days.

(21) Appl. No.: 16/958,489

(22) PCT Filed: Dec. 24, 2018

(86) PCT No.: PCT/AU2018/051410
§ 371 (c)(1),
(2) Date: Jun. 26, 2020

(87) PCT Pub. No.: WO2019/126843
PCT Pub. Date: Jul. 4, 2019

(65) Prior Publication Data
US 2021/0067017 A1    Mar. 4, 2021

(30) Foreign Application Priority Data

Dec. 28, 2017  (GB) .................................... 1722054.2
Dec. 20, 2018  (GB) .................................... 1820900.7

(51) Int. Cl.
*H02K 21/18*  (2006.01)
*H02K 7/08*   (2006.01)
*H02K 7/116*  (2006.01)

(52) U.S. Cl.
CPC ........... *H02K 21/185* (2013.01); *H02K 7/088* (2013.01); *H02K 7/116* (2013.01)

(58) Field of Classification Search
CPC .......... H02K 21/18; H02K 7/08; H02K 7/116; H02K 1/278; H02K 7/088; H02K 21/185; H02K 1/141; Y02T 10/64
See application file for complete search history.

(56) References Cited

U.S. PATENT DOCUMENTS 2,437,871 A  2/1943  Wood
2,705,762 A  4/1955  Pile
(Continued)

FOREIGN PATENT DOCUMENTS

CN  2110906 U  7/1992
DE  3732766    4/1988
(Continued)

OTHER PUBLICATIONS

International Search Report for International Application PCT/IL2016/051342 dated Mar. 23, 2017.
(Continued)

*Primary Examiner* — Naishadh N Desai
(74) *Attorney, Agent, or Firm* — Williams Mullen; F. Michael Sajovec

(57) ABSTRACT

A motor apparatus having a rotor that includes one or more permanent magnets disposed in ring-like manner, wherein similar poles of adjacent magnets face one another, and further wherein a gear mechanism (e.g., a toothed ring) is configured to transfer rotation from the rotor to an external gear mechanism. The motor may also include a stator comprising one or more solenoids and a bearing assembly that includes a rotating bearing element integrated with a toothed element for engaging with a gear and axle assembly. The rotating bearing element and integrated toothed gear element may pass through cavities of the main solenoids and provide for minimal cavity size, improving motor efficiencies.

11 Claims, 12 Drawing Sheets

(56) References Cited

U.S. PATENT DOCUMENTS

| | | | |
|---|---|---|---|
| 3,611,230 A | 10/1971 | Maake | |
| 3,936,683 A | 2/1976 | Walter | |
| 4,115,040 A | 9/1978 | Knorr | |
| 4,291,248 A | 9/1981 | Rainbolt | |
| 4,381,466 A | 4/1983 | Leanes | |
| 5,095,266 A | 3/1992 | Ohike et al. | |
| 5,105,111 A | 4/1992 | Luebke | |
| 5,138,207 A | 8/1992 | Hilal et al. | |
| 5,367,973 A | 11/1994 | Heggertveit | |
| 5,376,862 A | 12/1994 | Graid | |
| 5,633,555 A | 5/1997 | Ackerman | |
| 5,798,591 A | 8/1998 | Lillington et al. | |
| 5,844,343 A * | 12/1998 | Horst | H02K 19/06 |
| | | | 310/184 |
| 6,118,193 A | 9/2000 | Morris | |
| 6,252,317 B1 | 6/2001 | Scheffer et al. | |
| 6,777,847 B1 * | 8/2004 | Saban | H02K 1/265 |
| | | | 310/179 |
| 6,889,004 B2 | 5/2005 | Li | |
| 7,061,152 B2 * | 6/2006 | Petro | H02K 21/14 |
| | | | 310/156.38 |
| 7,508,104 B2 | 3/2009 | Schmidt | |
| 7,723,886 B2 | 5/2010 | Huber | |
| 8,221,247 B2 | 7/2012 | Lai | |
| 8,446,060 B1 | 5/2013 | Lugg | |
| 8,808,096 B2 | 8/2014 | Atkins | |
| 8,994,238 B2 | 3/2015 | Kamibayashi | |
| 9,013,081 B2 | 4/2015 | Atallah | |
| 9,385,581 B2 | 7/2016 | Enomoto | |
| 2005/0206260 A1 | 9/2005 | Akiyoma | |
| 2007/0046124 A1 | 3/2007 | Aydin et al. | |
| 2009/0323208 A1 | 12/2009 | Kurosawa | |
| 2010/0295397 A1 | 11/2010 | Dowis | |
| 2011/0037333 A1 | 2/2011 | Kais | |
| 2011/0291504 A1 | 12/2011 | Niedzialkowski | |
| 2012/0007458 A1 | 1/2012 | Rozinsky et al. | |
| 2012/0119596 A1 | 5/2012 | Doll et al. | |
| 2012/0262017 A1 | 10/2012 | Mengibar | |
| 2012/0280586 A1 | 11/2012 | Englert | |
| 2013/0011317 A1 | 5/2013 | Englert | |
| 2013/0123026 A1 | 5/2013 | Purdy | |
| 2014/0368095 A1 | 12/2014 | Kamibayashi | |
| 2015/0035403 A1 * | 2/2015 | Shlakhetski | H02K 21/12 |
| | | | 310/156.43 |
| 2015/0076948 A1 | 3/2015 | Katou | |
| 2015/0354625 A1 * | 12/2015 | Peterson | H02K 7/08 |
| | | | 310/14 |
| 2015/0364978 A1 | 12/2015 | Petkanchin | |
| 2016/0028299 A1 | 1/2016 | Mostoroy et al. | |

FOREIGN PATENT DOCUMENTS

| | | |
|---|---|---|
| DE | 202011051969 U1 | 9/2012 |
| EP | 0779699 A1 | 6/1997 |
| FR | 1487492 | 7/1967 |
| FR | 2766029 | 1/1999 |
| FR | 2782419 A1 | 2/2000 |
| GB | 2240666 A | 7/1991 |
| JP | H02-139461 A | 11/1990 |
| JP | 2000083365 A | 3/2002 |
| JP | 2003199283 A | 7/2003 |
| JP | 2012205348 A | 10/2012 |
| JP | 2015061422 A | 3/2015 |
| WO | 8101633 | 6/1981 |
| WO | 9607611 | 3/1996 |
| WO | 2013140400 A1 | 9/2013 |
| WO | 2014147612 A1 | 9/2014 |
| WO | 2017064699 A1 | 4/2017 |

OTHER PUBLICATIONS

Extended European Search Report, Application No. 18895996.9, dated Aug. 10, 2021, 7 pages.

* cited by examiner

ELECTRIC MOTOR

CROSS REFERENCE TO RELATED APPLICATIONS

This application is a U.S. National Stage of PCT/AU2018/051410, filed on Dec. 24, 2018 now published as WO2019/126843 on Jul. 4, 2019 which claims priority to GB1722054.2 filed on Dec. 28, 2017 and GB 1820900.7 filed on Dec. 20, 2018, the entirety of each are expressly incorporated by reference.

TECHNICAL FIELD

The present disclosure relates to the field of electric motors.

BACKGROUND

Electric motors of the rotational type are well known, and have been widely used for many years for converting electrical energy to mechanical energy. A typical electric motor may have a rotor and a stator.

The moving part of the motor is typically designated the rotor, and may include a turning shaft or similar mechanism for delivering rotation to a load. The stationary part of the motor is often designated the stator, which typically includes windings of conductors and/or permanent magnets. In some motors, thin metal sheets (sometimes referred to as "laminations) may be arranged in the stator's core, which may reduce energy losses that would otherwise result if a solid core were utilized.

In most instances, conductors will be arranged on or within the rotor for carrying electrical currents for interacting with a magnetic field of the stator (e.g., where the stator includes one or more permanent magnets). The electromagnetic interaction between the rotor and the stator provide the forces that turn the shaft and operate on the load. In another alternative, the rotor may include permanent magnets, while the stator includes current carrying conductors. In either configuration, electric motors like those described generally above may also be used in a reverse functional manner to convert mechanical energy into electrical energy (i.e., as a generator).

Certain non-typical brushless DC motor structures are known in the art. For example, WO 2013/140400 teaches a non-typical structure of a brushless DC motor that may include a plurality of permanent magnets that are equi-angularly spaced and/or equi-radially disposed along a circular ring-like rotor structure, and a plurality of solenoids that are equiangularly spaced and equi-radially disposed at static positions. Each of the solenoid housings includes a cavity section for the plurality of magnets to pass through as the ring-like rotor with the plurality of magnets rotates around its axis. WO 2013/140400 also teaches that the rotation of the rotor is caused by a variable and controlled supply of DC current to the solenoids, with the direction of the current being timely reversed based on the relative positioning of the permanent magnets to the solenoids.

As disclosed in WO 2013/140400, the motion of the magnets with respect to the solenoids may be quasi-linear. In addition, WO 2013/140400 teaches that spacers of high permeability material (such as iron) may be positioned between each two adjacent permanent magnets, thereby increasing the density of the magnetic field in the region between each pair of adjacent permanent magnets (this structure will be referred to herein as magnets-spacers structure). The motor of WO 2013/140400 may also include one or more sensors used to determine, during the rotation of the rotor, the position of the permanent magnets relative to solenoids, and a controller for controlling the supply of current to the solenoids. In an embodiment of WO 2013/140400, the rotor may be mechanically connected to a powertransmission means, such as a toothed element.

Notwithstanding certain benefits, the motor disclosed in WO 2013/140400 suffers from various drawbacks and disadvantages. For example, the motor of WO 2013/140400 slack the ability to start in situations where the plurality of permanent magnets on the rotor are substantially aligned at the middle line of its respective solenoid (a so-called "dead orientation"). To account for such alignment, it may be necessary to include a mechanism for initiating rotation of the motor when starting in such dead orientations. It is therefore an object of the present disclosure to teach various mechanisms for starting the motor when disposed in one or more dead orientations.

Another disadvantage of the motor disclosed in WO 2013/140400 is that the toothed ring positioned below the disclosed magnets-spacers structure can make the ring-like structure disclosed therein relatively cumbersome and large. WO 2013/140400 teaches, for example, that the toothed ring must pass through the cavities of the solenoids, thereby requiring the cavity in the solenoid to be larger than the permanent magnets alone. Such arrangements necessitate an undesirable increase in overall weight (from the larger solenoids and relatively heavy toothed ring), and an undesirable increase in overall motor volume (resulting from the need for increased cavity size). It is therefore an object of the present disclosure to provide solutions for reducing the overall volume and weight of brushless DC motors generally, including the motor taught by WO 2013/140400.

Yet another exemplary disadvantage of the motor disclosed in WO 2013/140400 is its inability to be optimized for any energy saving functionality. For example, WO 2013/140400 teaches no mechanism for recharging batteries and/or storing extra electrical energy that may be produced by the motor. It is therefore an object of the present disclosure to teach mechanisms and/or methods for managing energy in a motor (such as, for example, the motor in WO 2013/140400), and to provide for the recharging of batteries using unused energy from the motor.

It is also an object of the present disclosure to provide an electric motor in which the magnetic field density in regions between any two adjacent permanent magnets may be higher than the magnetic density in a similar region in other motors (e.g., the motor disclosed in WO 2013/140400), particularly those lacking any magnets-spacer structure. Other objects and advantages of the present disclosure will become apparent as the description proceeds.

SUMMARY

There is provided an electric motor in accordance with the claims. An electrical motor comprises a rotor, a stator and a bearing assembly. The stator comprises one or more main solenoids, each comprising a cavity. The rotor comprises a plurality of permanent magnets disposed in a ring-like manner, wherein similar poles of adjacent magnets face one another. The rotor further comprises a gear mechanism for interfacing with an axle gear mechanism. The bearing assembly comprises an inner and outer ring with one or more bearings disposed therebetween, wherein the inner ring is stationary and the outer ring is movable relative to the inner ring, and further wherein the outer ring comprises the gear mechanism for interfacing with the axle gear mechanism. The permanent magnets are arranged to pass through the cavities of the main solenoids.

Optionally, the electric motor further comprises air spaces in regions between ends of each pair of adjacent magnets, and each of said permanent magnets is narrowed at its end in a form of a truncated pyramid or cone to cause concentration of the magnetic field at each of said regions, respectively.

In embodiments, each of the one or more bearings has a spherical or cylindrical shape.

In embodiments, the one or more bearings comprise ball bearings or roller bearings.

In embodiments, the electric motor further comprises one or more starter solenoids. Optionally, the one or more starter solenoids are disposed between each pair of main solenoids. Optionally, rotation of the rotor induces electrical currents in the one or more starter solenoids. Optionally, the one or more starter solenoids may be selectively disengaged from the system such that electrical currents are not induced in the one or more starter solenoids. Optionally, a physical width of the one or more starter solenoids is less than the one or more main solenoids. Optionally, the one or more starter solenoids each have more windings relative to the one or more main solenoids.

In embodiments, the outer ring passes through cavities of the main solenoids.

DETAILED DESCRIPTION

Figure 1:
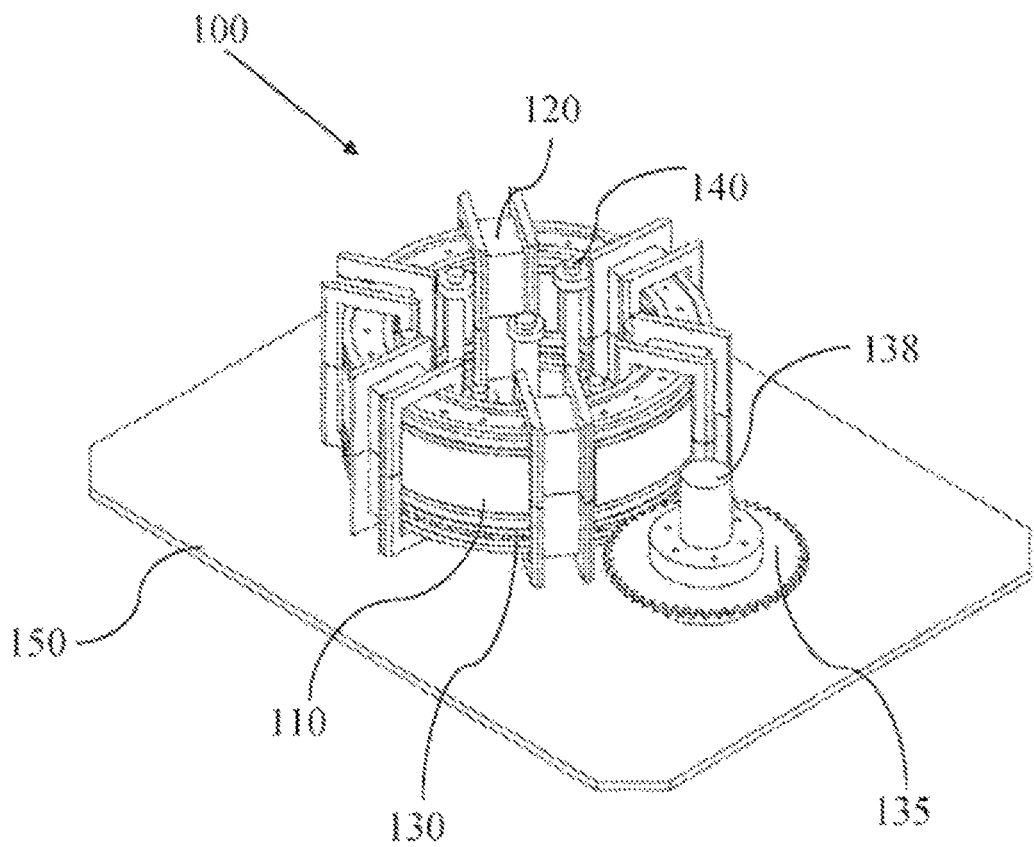
FIG. 1 is a perspective view of a prior art motor disclosed in WO 2013/140400.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

It should be initially understood that all of the features disclosed herein may be combined in any combination, except combinations where at least some of such features and/or steps are mutually exclusive.

Figure 2:
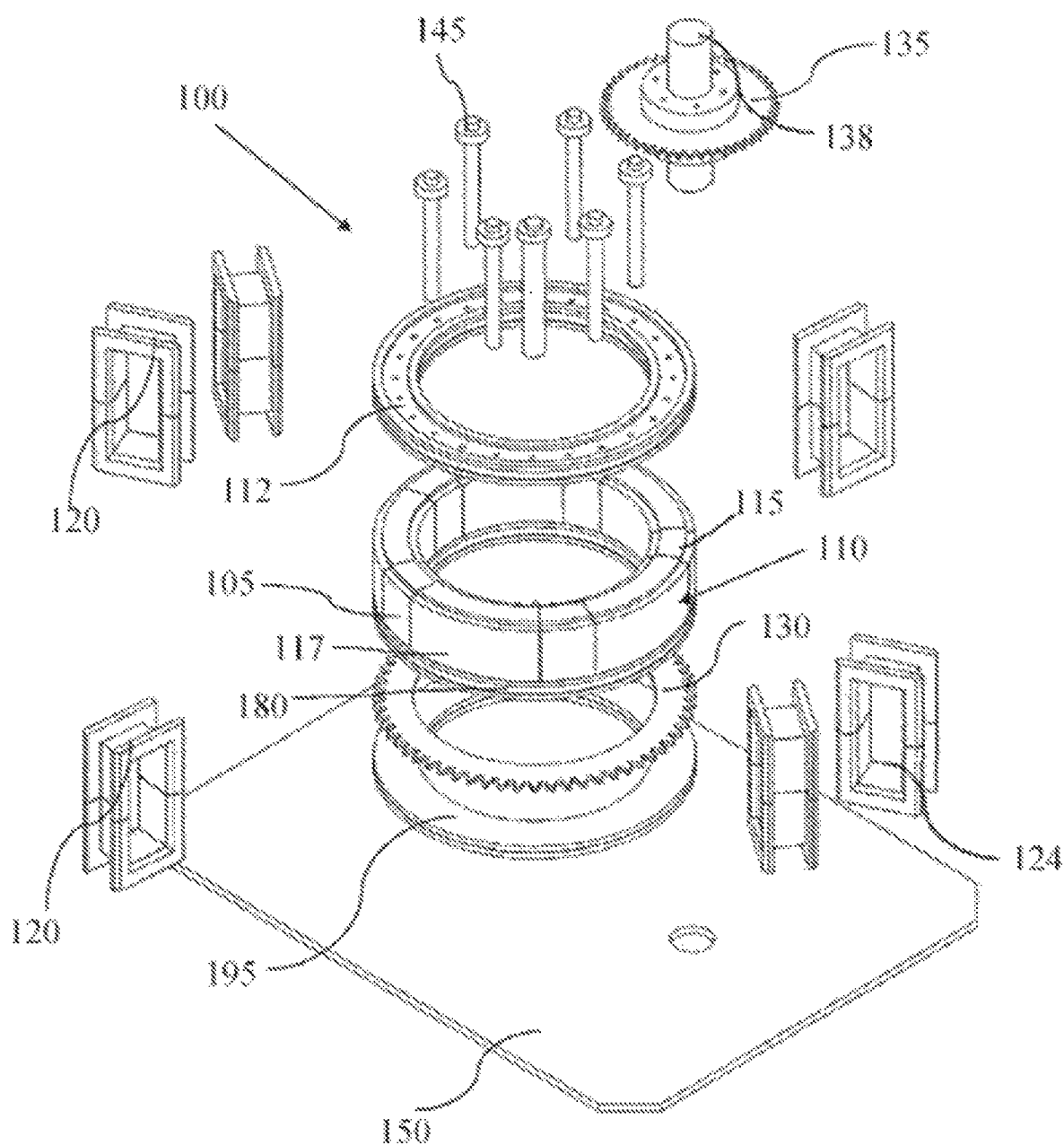
FIG. 2 is an exploded view of the motor of FIG. 1.

Referring now to FIG. 1, a general structure of an exemplary DC brushless motor 100 known in the prior art is presented; specifically, the motor disclosed in WO 2013/140400. FIG. 2 presents an exemplary exploded view of the motor 100 illustrated in FIG. 1. As illustrated, prior art motor 100 includes a ring-like rotor 110, and a plurality of solenoids 120. The solenoids 120 are generally equi-radially disposed and/or equi-angularly spaced about a central axis (not pictured) of rotor 110. Toothed ring 130 lies along the bottom of rotor 110 and is configured to interact with gear 135, which in turn is coupled to axle 138. Motor 100 also includes roller-shaped bearings 140 that are used to both support rotor 110 and generally enable smooth rotation of rotor 100. Motor 100 may be positioned on a supporting base, such as for example base 150.

Referring now to FIG. 2, the prior art rotor 110 disclosed in WO 2013/140400 includes a plurality of permanent magnets 115, and a plurality of spacers 117 disposed between the magnets 115. The spacers 117 are typically made from a high permeability material. Rotor 110 also includes an upper ring 112 positioned above the permanent magnets 115 and spacers 117 that is in contact with bearings 140. Ring 112 thereby supports the rotor 110 and provides for a smooth rotation of rotor 112. Rotor 112 also includes a magnets-supporting ring 180 on which the magnets 115 and spacers 117 are installed. Solenoids 120 are also provided.

In general, as taught in greater detail in WO 2013/140400, motor 100 operates by supplying DC current through windings of conductors in the solenoids 120. The magnetic fields induced by the currents flowing through solenoids 120 interact with the magnet fields of magnets 115. To substantially eliminate or greatly reduce induction of back-EMF in the conductors (which reduces the effective current being driven through the conductors of the solenoids 120), a controller in motor 100 times the magnitude and direction of the current through the conductors in a manner such that the driven current is maximized when the induced back-EMF is lowest, and vice versa.

Below the magnets-supporting ring is toothed ring 130 which transfers the moment of rotation of rotor 110 to gear 135. Toothed ring 130 cooperates with gear 135 to transfer power from the motor 100 generally to axle 138. A bottom ring 195 is provided to support the structure of rotor 110. WO 2013/140400 teaches that each of the upper ring 112, the magnets 115 and spacers 117, the magnets-supporting ring 180, the toothed ring 130, and bottom ring 195 are each rigidly connected to one another and rotate together such that each pass through cavities 124 of solenoids 120.

Figure 3:
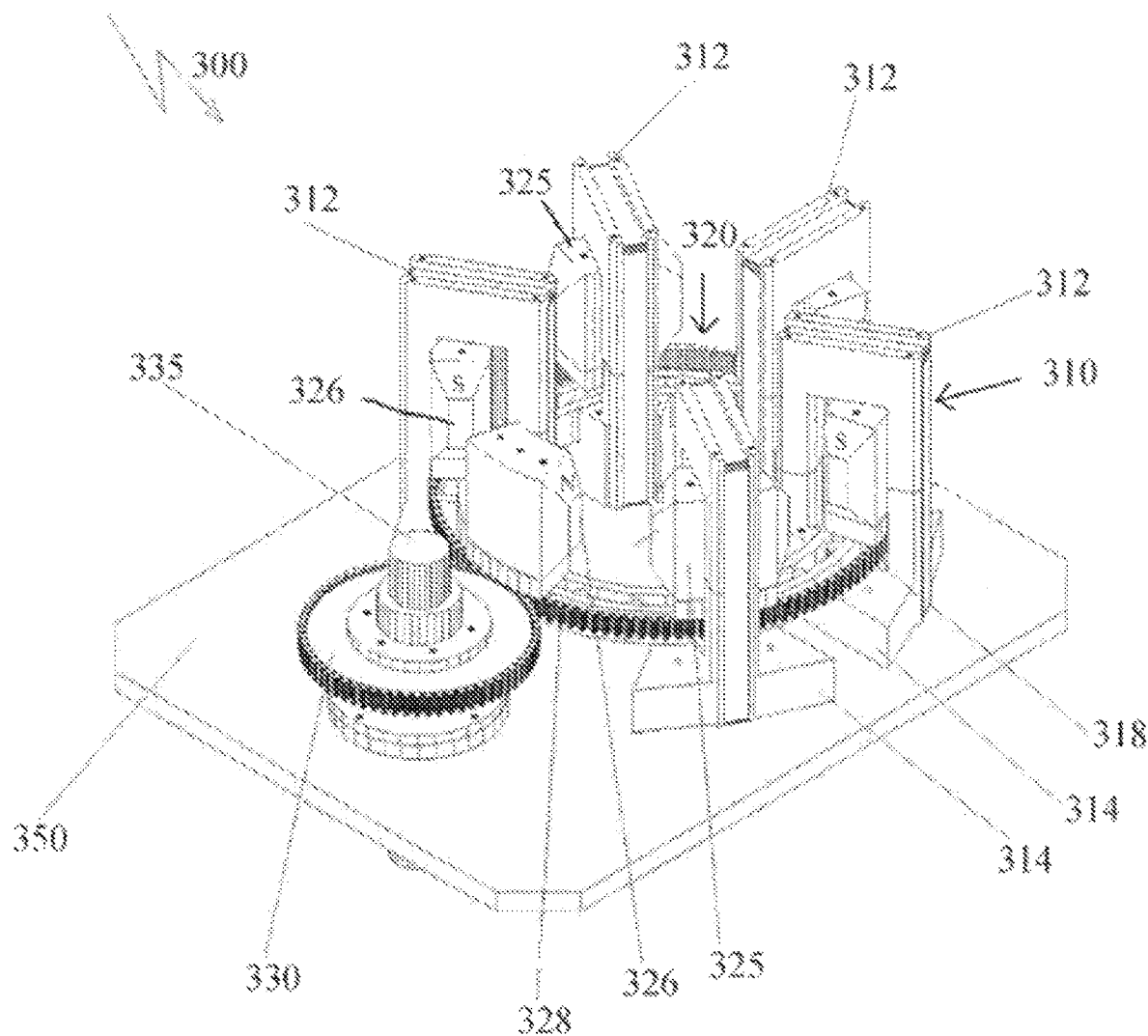
FIG. 3 is a perspective view of a brushless DC motor according to one embodiment of the present disclosure.

Referring now to FIG. 3, an exemplary embodiment of an electric motor 300 according to various aspects of the present disclosure is presented. In some embodiments, motor 300 may include a stator assembly 310 and a rotor assembly 320. The stator assembly 310 may include one or more main solenoids 312. In some embodiments, the one or more main solenoids 312 may be equi-angularly spaced and/or equi-radially disposed about a central axis (not shown) of the rotor assembly 320. Each of the one or more main solenoids may include a cavity 318, and may also be coupled or otherwise associated with a main solenoid base 314.

The rotor assembly 320 may, in some embodiments, include one or more permanent magnets 325 (having typical N-S polarity), and may also include a toothed ring element 328. The number of permanent magnets 325 may (or optionally may not) correspond to the number of main solenoids 312. In some embodiments, the one or more permanent magnets 325 and toothed ring 328 pass through cavities 318 of main solenoids 312. In addition, the toothed ring 328 of the rotor assembly 320 may be utilized to interact with a gear 330, which may optionally be rigidly coupled to a main axle 335. Note that any other applicable drive mechanism may also be employed, including a belt-drive system or the like. In some embodiments, motor 300 may be supported by a base 350.

Unlike some motors in the prior art (e.g., the motor disclosed in WO 2013/140400), motor 300 may, in some embodiments, lack spacers made from a high permeability material disposed on rotor assembly 320 between the permanent magnets (e.g., may lack spacers 117 of FIG. 2), relying instead on free space alone. Eliminating the use of such spacers (e.g., spacers 117) includes the benefit of reduced materials and weight, but may sacrifice certain magnetic field benefits that a high-permeability material may provide, for example, increased field density and homogeneity.

To account for some or all of any loss in desired magnetic field characteristics resulting from elimination of such spacers (e.g., spacers 177), in some embodiments, permanent magnets 325 may be narrowed at each end (e.g., truncated end 326) in the form of, for example, a truncated cone or pyramid (or other desired and/or effective shape) to optionally increase one or more of the magnetic field homogeneity and density between adjacent permanent magnets 325. More particularly, such a narrowed end form (e.g., end 326) can cause the magnetic field between the magnets 325 to be more dense and more homogenic generally without having to use spacers of high permeability material that may disadvantageously increase, for example, the overall weight of the motor 300.

In some embodiments, motor 300 may utilize any number of bearing assembly arrangements. For example, FIG. 3 illustrates one exemplary bearing assembly 360, and is discussed in greater detail with reference to FIGS. 5A-5C below. Alternatively, motor 300 may utilize the exemplary bearing assembly 460 presented with reference to FIGS. 4A-4B.

Figure 4A:
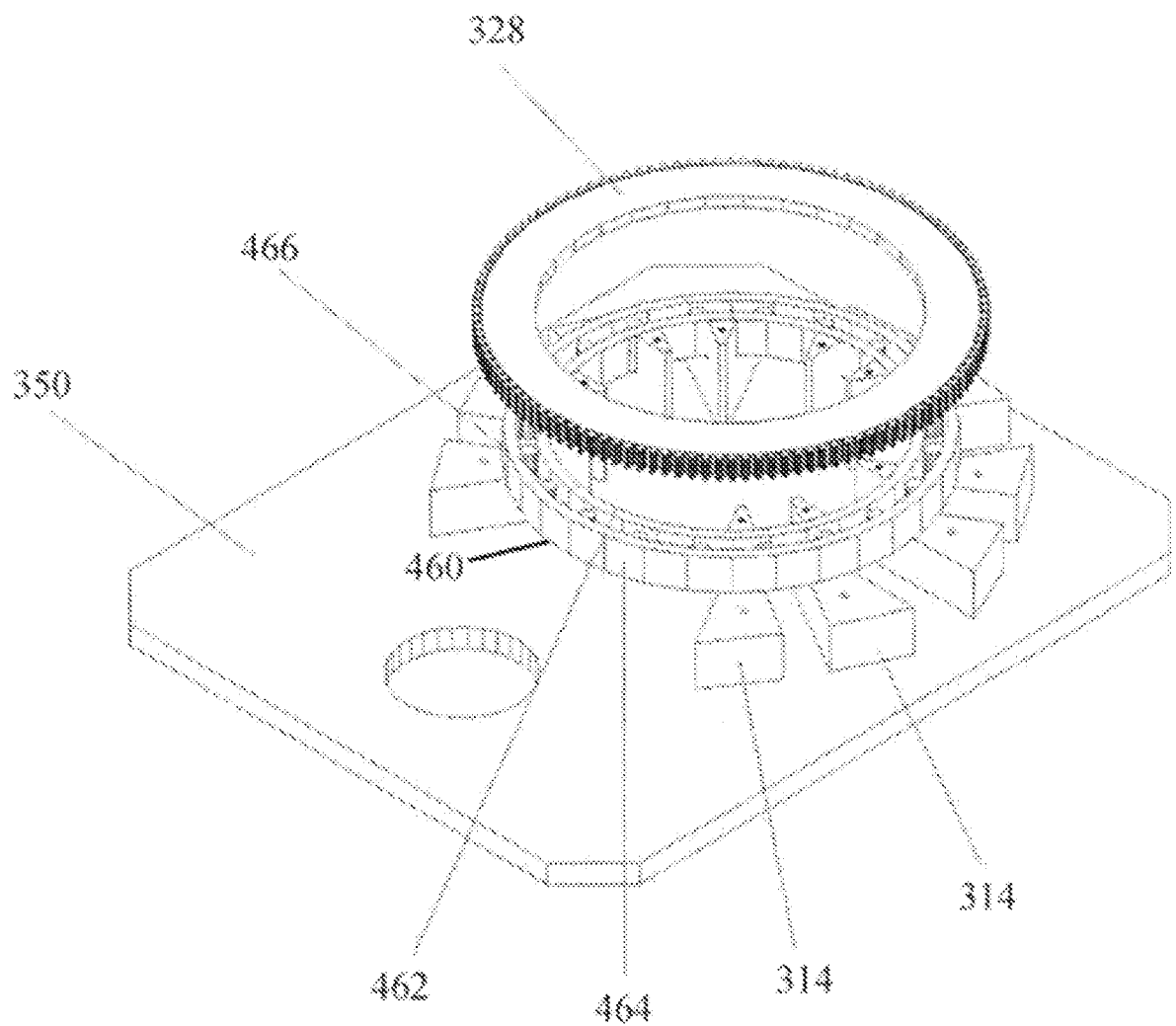
FIG. 4A is a perspective view of a bearing assembly structure of a brushless DC motor according to one embodiment of the present disclosure.
Figure 4B:
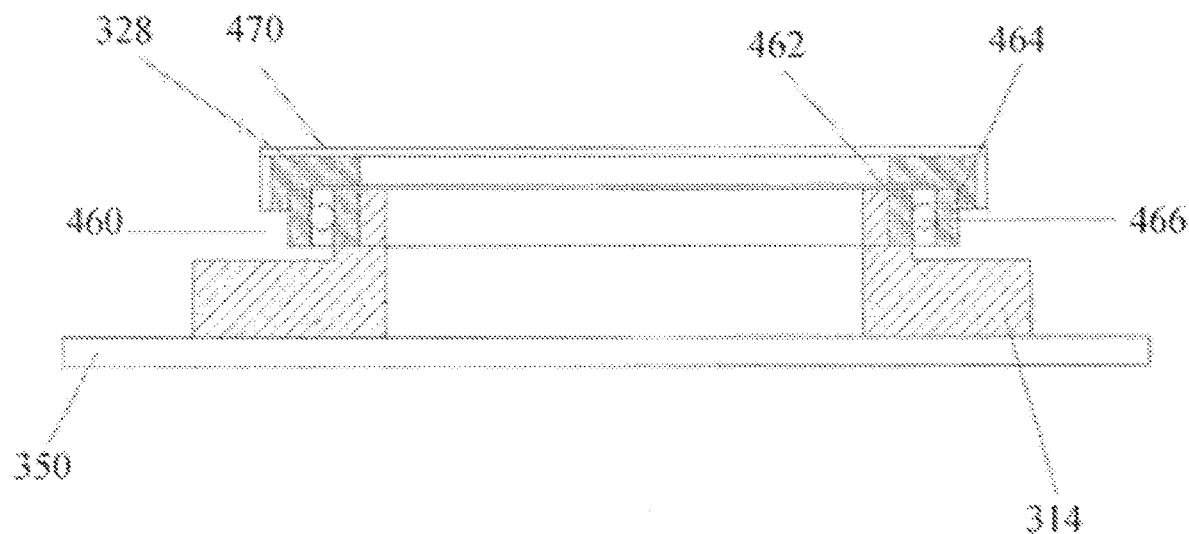
FIG. 4B is a cross-sectional view of the bearing assembly structure of the brushless DC motor illustrated in FIG. 4A.

Referring first to FIG. 4A, a perspective view of one embodiment of bearing assembly 460 is presented, with a cross-sectional view of the same presented in FIG. 4B. Bearing assembly 460 is presented alongside optional base 350, solenoid bases 314, and toothed ring element 328. Bearing assembly 460 may include, in some embodiments, two coaxial rings—inner ring 462 and outer ring 464—with one or more bearings 466 disposed therebetween. In some embodiments, outer ring 462 may be stationary, while outer ring 464 may be movable relative to inner ring 462 (though the opposite arrangement may be used if desired). Bearings 466 may be used to facilitate the movement of outer ring 464 relative to inner ring 462 (or vice versa) in a manner that minimizes friction. For example, bearings 466 may be spherical ball bearings, cylindrical bearings, or any other relatively low-friction assembly (Teflon, greased systems, etc.). Notably, unlike the embodiment shown in FIG. 3 (and the similar embodiment discussed hereinbelow with respect to, for example, FIGS. 5A-5D), bearing assembly 460 shown in FIGS. 4A and 4B may include toothed ring element 328 as a separate element relative to outer ring 464.

In some embodiments, toothed ring 328 may be coupled to movable outer ring 464 such that toothed ring 328 and the remainder of rotor assembly 320 (e.g., permanent magnets 325) may be free to rotate about the central axis (not shown) of the rotor 320. In some embodiments, as illustrated for example in FIG. 4B, permanent magnets 325 may be supported by and/or coupled to magnet support ring 470. In some embodiments, the bearing assembly 460, including toothed ring 328, magnet supporting ring 470, outer ring 464, inner ring 462, and bearings 466 may be made from non-ferrous or non-magnetic materials.

As noted hereinabove, both in the discussion of the motor disclosed in WO 2013/140400 and with respect to the discussion regarding FIGS. 4A and 4B, magnet supporting ring (180 (FIG. 2) and 470 (FIG. 4B)) and toothed ring (130 (FIGS. 1 & 2) and 328 (FIGS. 4A & 4B)) may be separate elements. Accordingly, there may be an undesirable enlargement of the cavity (124/318) required in each of the main solenoids (120/312) to accommodate the inherent increase in space required for separate elements to simultaneously pass through the cavities (124/318), thereby in some embodiments necessitating an undesirable enlargement of the overall volume and/or weight of the disclosed motor generally. The bearing assembly may be used with the various elements illustrated in FIG. 3 if desired, and vice versa.

Figure 5A:
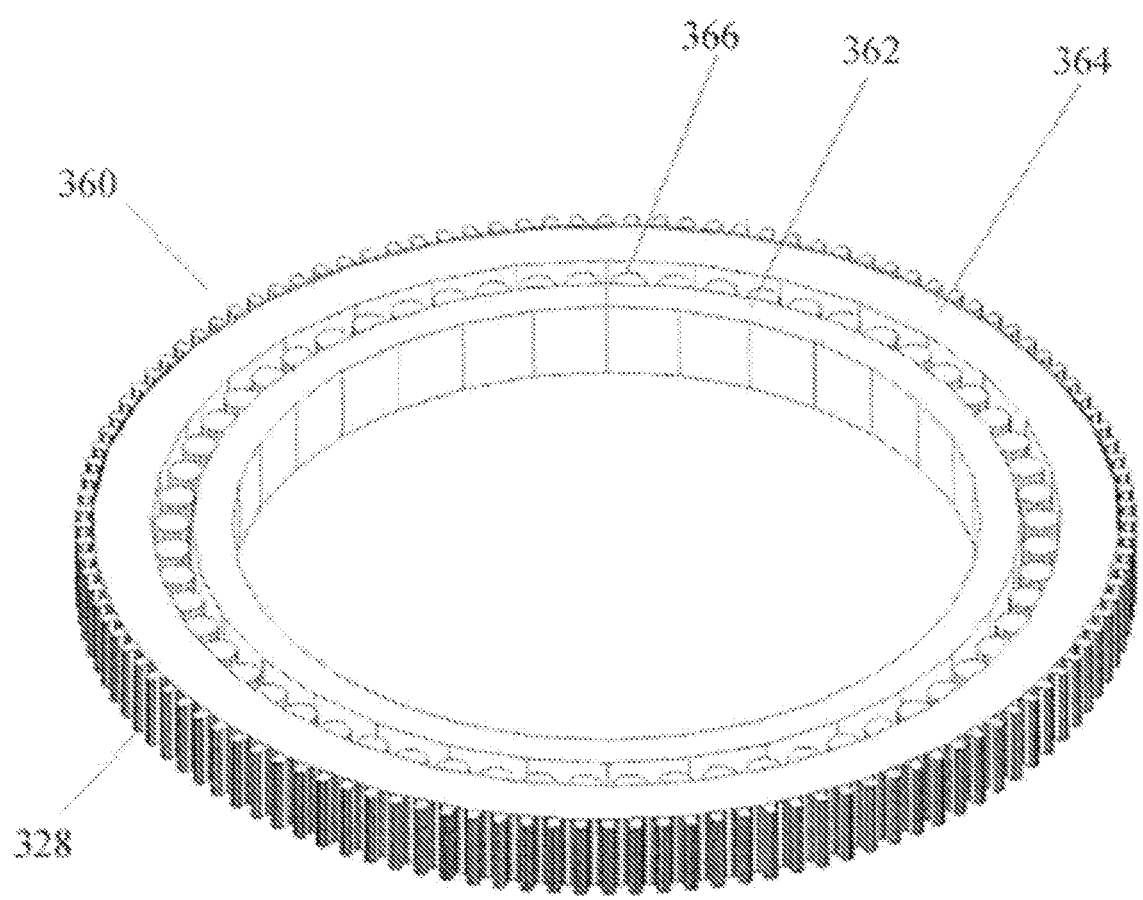
FIGS. 5A-5C present perspective views of portions of a bearing assembly according to one embodiment of the present disclosure.
Figure 5B:
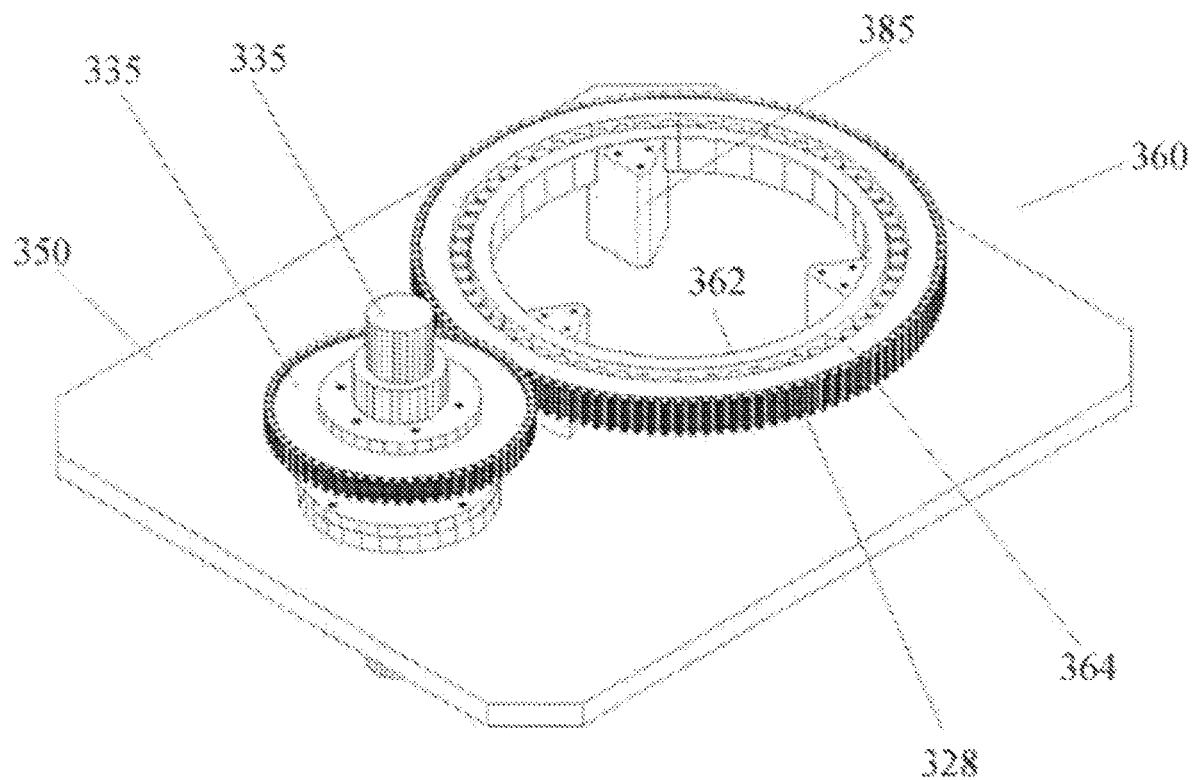

In an alternative embodiment, and referring now to FIGS. 5A-5D, more detailed presentations of bearing assembly 360 first illustrated in FIG. 3 are presented. Referring first to FIG. 5A, bearing assembly 360 may include an inner ring 362 and an outer ring 364, with bearings 366 disposed therebetween. Advantageously, outer ring 364 may also include toothed ring element 328 such that outer ring 364 and toothed ring element 328 are integrated together in a single element. As illustrated in, for example, FIG. 5B, outer ring 364 and integrated toothed ring 328 may intermesh with gear 330, which in turn may be coupled to main axle 335. In some embodiments, inner ring 362 may be stationary, and may be coupled to one or more mounts 385. Mounts 385 may be optionally secured to base 350.

In the various arrangements disclosed hereinabove, outer ring 364 and integrated toothed ring 328 may require less volume and/or less weight in the overall motor 300 relative to motors disclosed in the prior art, and may advantageously reduce the necessary size of the one or more cavities 318. In reducing the necessary size of cavities 318, windings of a smaller diameter may be utilized in main solenoids 312, resulting in various advantageous benefits, including for example relatively increased electromagnetic forces, reduced material use, reduced overall weight, and others.

Figure 5C:
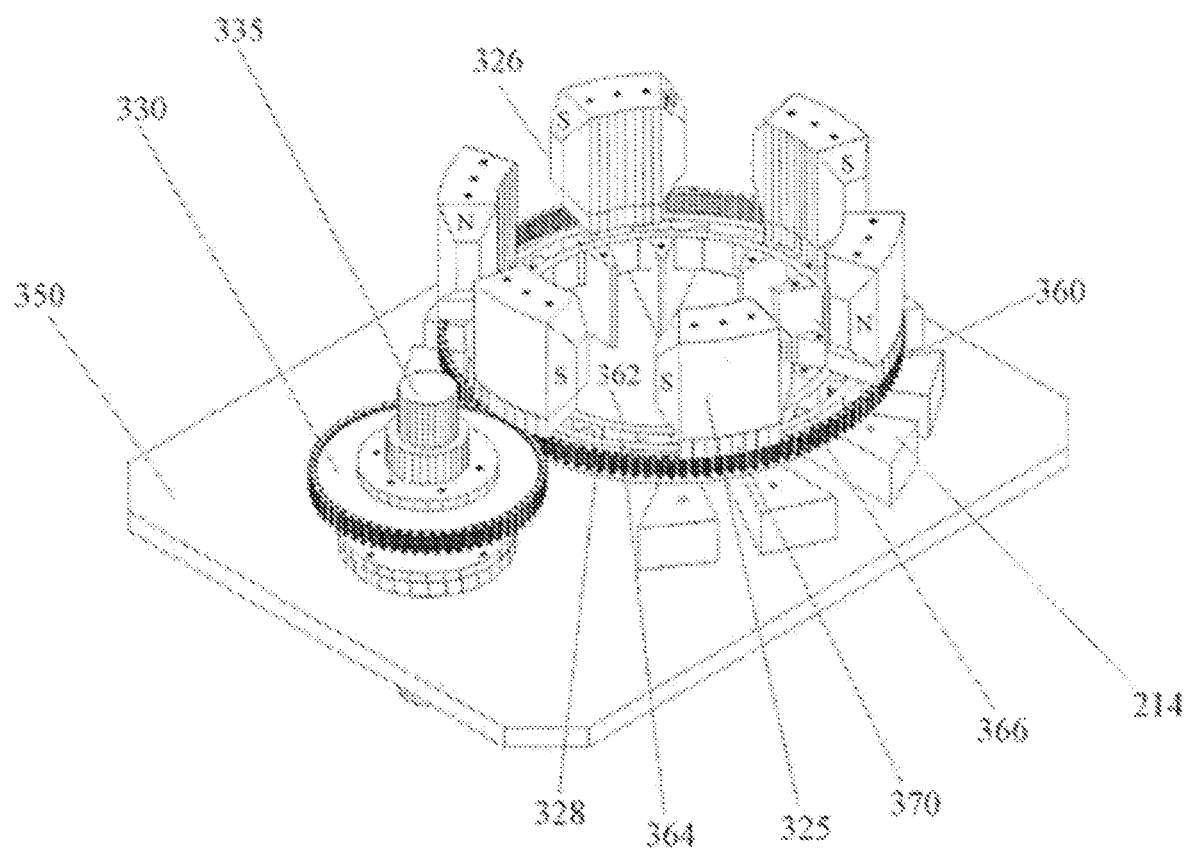
Figure 5D:
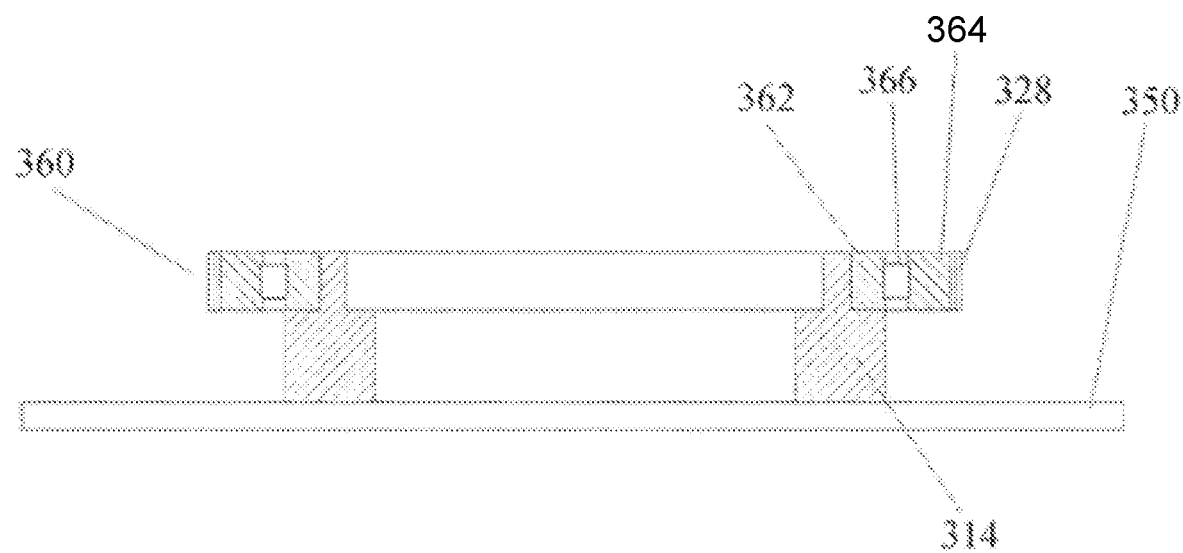
FIG. 5D is a cross-sectional view of the bearing assembly illustrated in FIGS. 5A-5C.

Referring now to FIGS. 5C & 5D, additional components of rotor 320 are presented. In particular, some embodiments of rotor 320 may include permanent magnets 325 coupled to both outer ring 364 and integrated toothed ring element 328. In some embodiments, magnets 325 may be coupled to outer ring 364 via, for example, magnet base 370. In operation, forces from the stator 310 my act upon magnets 325 to induce rotation in the rotor 320, thereby causing toothed ring element 328 to act on gear 330, and transfer power from the motor 300 to main axle 335. In some embodiments, outer ring 364 may be relatively higher than inner ring 362 to avoid friction, etc.

As noted above, one shortcoming that can be associated with motors like those disclosed in WO 2013/140400, for example, is the possibility of having to start the motor in a "dead orientation" where each symmetric line of each permanent magnet (e.g., magnets 325) coincides with a middle longitudinal line of a respective main solenoid 312. In such an orientation, the net force imparted by the stator (e.g., stator 310) to the rotor (e.g., rotor 320) may be substantially zero.

Figure 6:
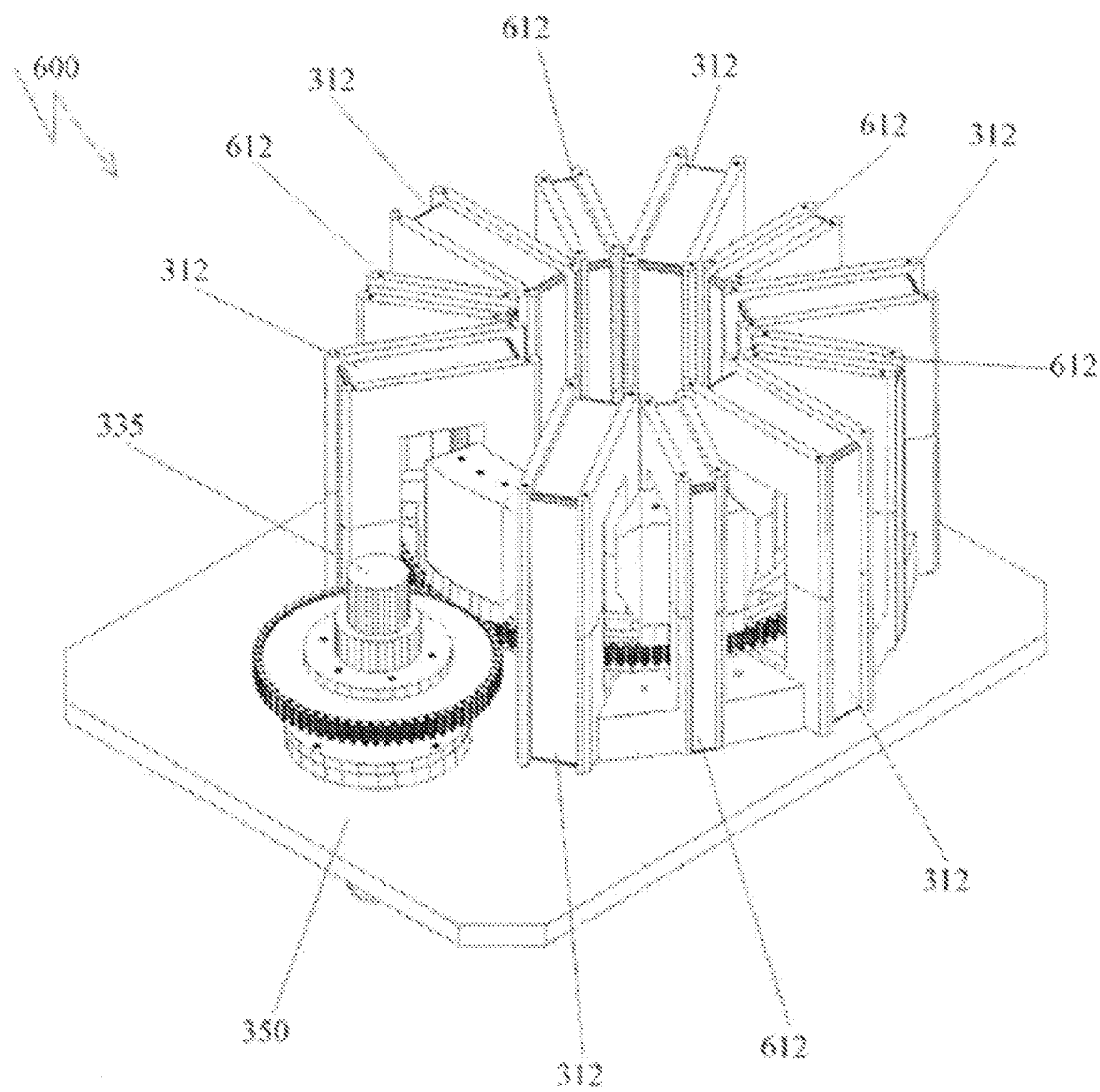
FIG. 6 is a perspective view of a brushless DC motor according to one embodiment of the present disclosure.

Referring now to FIG. 6, yet another embodiment of the present disclosure is presented that may overcome the aforementioned shortcomings. More particularly, FIG. 6 illustrates an exemplary embodiment of a motor 600 substantially similar to motor 300, but which also includes one or more additional starter solenoids 612 that may supplement main solenoids 312. In some embodiments, the number of starter solenoids 612 may be the same as the number of main solenoids 312, yet any number of starter solenoids 612 may be utilized. Starter solenoids 612 may, in some embodiments, be disposed between each of the main solenoids 312. Advantageously, the present disclosure that does not require roller bearings 140 discussed with reference to FIG. 1. Accordingly, starter solenoids 612 may be placed, if desired, in or about the area between the main solenoids 312.

Additionally, because starter solenoids 612 may generally be utilized to induce an initial rotation in the rotor (e.g., rotor 320), rather than for primarily drive rotation, starter solenoids 612 may be, if desired, smaller than main solenoids 312 (though starter solenoids may also be the same size or larger than main solenoids 312 if desired).

Each of the main solenoids 312 and starter solenoids 612 may be wound with one or more turns of conducting wire. In general, any number of turns may be utilized for either or both of the main solenoids 312 and the starter solenoids 612. In some embodiments, for example, the starter solenoids 612 may utilize more turns than the main solenoids 312, while in other embodiments the main solenoids 312 may have the same number of turns or more turns than the starter solenoids 612. In some embodiments, for example, the main solenoids 312 may include 7-20 turns, while the starter solenoids may include at or around 300 turns. In some embodiments, as discussed further below, starter solenoids 612 may utilize a relatively high number of turns to better capture energy from the rotor 320 and convert the mechanical energy to electrical energy.

Once the motor (e.g., motor 600) is started, there is generally no longer a need for the starter solenoids 612 to start the motor until the next time a motor start is necessary. The starter solenoids 612 may, however, be utilized in some embodiments for other beneficial purposes outside starting the motor. For example, it is well-known in the art that a typical DC motor may serve as a generator when reversed (for example, when forces imparted on the axle/rotor to generate rotation induce currents in the windings of the stator). Accordingly, when not being utilized for their motor starting function, starter solenoids 612 may be utilized, in some embodiments, to capture energy from the motor and, for example, charge a battery or provide some other electrical function. For example, if motor 600 was utilized in a vehicle, the vehicle's momentum could be used in some circumstances to drive the rotor 320 and induce currents in the starter solenoids 612 which could be used to charge one or more batteries (e.g., a back-up battery and/or in some circumstances, a primary battery). Advantageously, the starter solenoids 612 may be optionally engaged and disengaged to maximize efficiency and eliminate drag on the motor system went undesired. In like manner, a switching mechanism for optionally engaging or disengaging the starter solenoids 612 may be advantageously be employed to impart drag on the motor 300 to serve a braking function.

In general, the main solenoids 312 of motor 600 may be fed with a substantially DC voltage. In some embodiments, the magnitude and/or direction of the DC voltage is controlled by one or more controllers such that, in a manner as described in for example WO 2013/140400, when the center of each permanent magnet 325 (i.e., the line of symmetry of the magnet 325) passes below the middle line of the respective main solenoid 312, the direction of the current is reversed. The controller may, in some embodiments, receive certain inputs from one or more sensors (e.g., optical sensors or Hall-effect sensors) to determine the angular orientation of the rotor 320 to facilitate control of the aforesaid DC current magnitude and direction. Other factors such as rounds/minute and/or acceleration may also be measured, calculated, and/or relied upon for such control.

It will be understood that starter solenoids 612 may be utilized with the embodiments illustrated for example in FIG. 6, and in the embodiments illustrated in FIGS. 3, 4A-4B, and 5A-5D, in addition to FIGS. 7 and 8A-8C.

Figure 7:
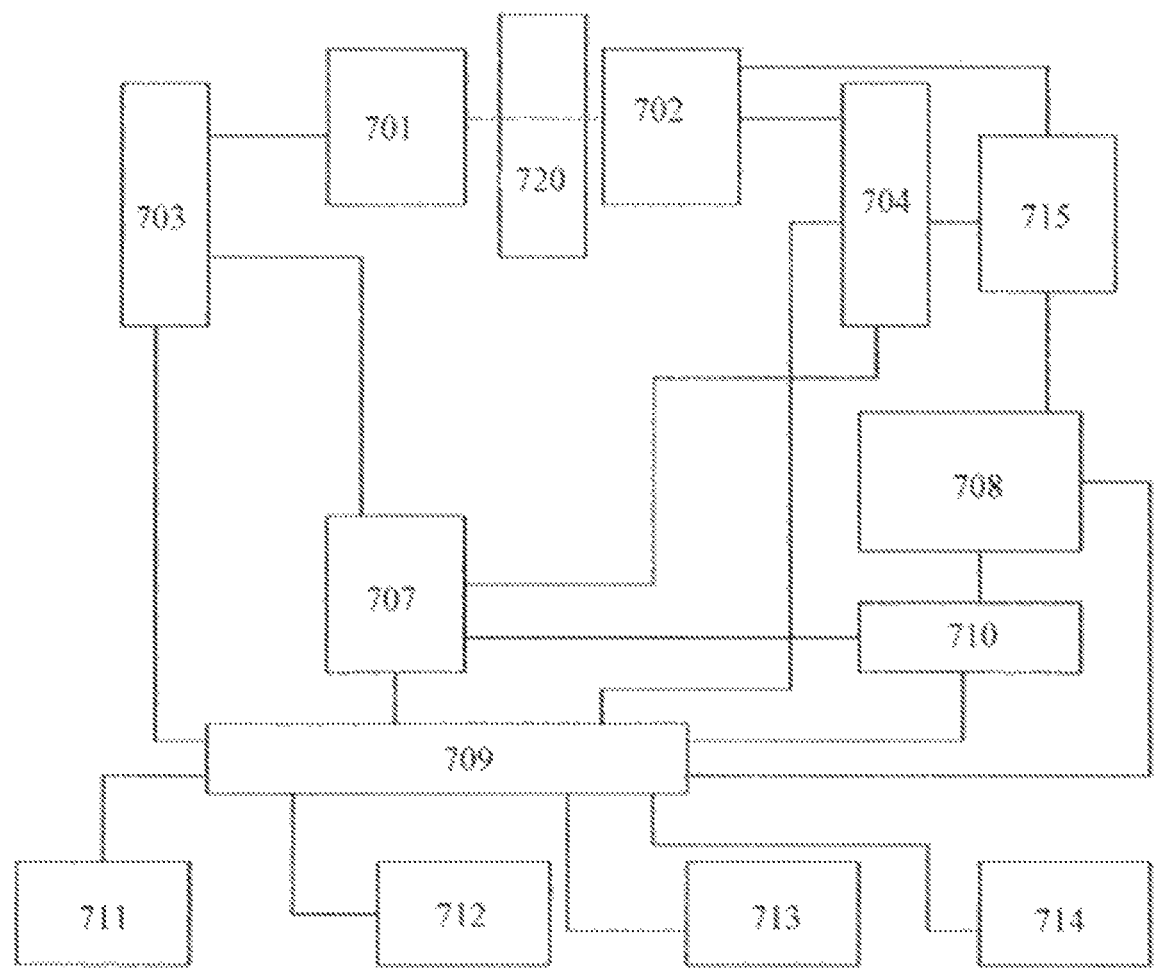
FIG. 7 presents a block diagram of an exemplary general control scheme of an exemplary embodiment of the motor of the present disclosure.

Referring now to FIG. 7, a block diagram of an exemplary motor control scheme is presented. In the block diagram, the following elements are presented, with additional detail to follow:

720: Rotor;
701: The group of main solenoids;
702: The group of starter solenoids;
703: A main driving unit for supplying signals to the main solenoids 701 based on timing signals that are received from the basic controller 709;
711, 712, 713, 714: Sensors at the main solenoids 312 (see, e.g., FIG. 6), that are used to sense the angular position of the permanent magnets (e.g., magnets 325) on the rotor 720 with respect to the main solenoids 701 (namely, the "angular orientation");
709: Basic controller for providing timing and current direction signals to the main driving unit 703 and to a starter driving unit 702, respectively, in addition to other general control functionalities that will be described hereinafter;
707: A main battery for operating the motor;
708: A backup battery and energy regulator 710 for checking the voltage level at the backup battery, and when the back-up battery is found to be full, for routing the excessive energy from the backup battery to the main battery;
704: A starter driving unit for supplying signals to the starter solenoids 702 based on timing signals that are received from the basic controller 709;
715: A voltage converter for converting an induced voltage received from the starter solenoids 702 to DC voltage, and for charging the backup battery 708 by said DC voltage;

In some embodiments, when for example it is initially necessary to start the disclosed motor, the basic controller 709 may determine the angular orientation of the rotor based on one or more of sensors 711, 712, 713, and 714. More specifically, in some examples, the basic controller 709 may check whether the permanent magnets are located within a predefined range of "dead orientation" or not (the length of this range may be, for example, ±5% of the length of each permanent magnet). In the negative case, the basic controller 709 may convey timing signals to the main driving unit 703, which in turn may supply driving signals to the main solenoids 701 which may then initiate rotation of the rotor (e.g., rotor 320). These signals may be substantially pulse width modulation (PWM) signals wherein the timing of such signals may depend on, for example, the desired rotation speed. Such signal may also be any other signal type known in the art for driving DC currents. Such signals may also be controlled to switch their current direction each time that the symmetry line of each of the permanent magnets passes below the middle line of the respective main solenoid 701.

If, however, the controller 709 determines that the orientation of the rotor is within said range of "dead orientation", the controller 709 may communicate timing signals to the starter driving unit 704, which in turn may supply driving signals to the starter solenoids 702 for causing an initial drive of the rotor, namely to remove the permanent magnets of the rotor out of the "dead orientation". A short period after said initial drive out of the dead orientation, the controller 709 may direct the timing signals so as to convey them to the main driving unit 703 to cause, for example, a normal rotation of the rotor by signals that are supplied to the main solenoids 701. Energy regulator 710 may measure the energy level at one or more batteries (e.g., backup battery 710), and re-distribute such energy as desired (e.g., to a main battery 707 when backup battery 710 is full, for example).

Accordingly, FIG. 7 illustrates in block diagram form how, among other things, the presently disclosed motor may be initiated, either when in a "dead orientation" or not. Further, the scheme illustrated in FIG. 7 demonstrates how energy may be saved by accumulating energy within the starter solenoids and re-distributing it as desired to, for example, charge a battery. The structure of FIG. 7 may be applied to each of the embodiments illustrated and disclosed herein with respect to FIGS. 3, 4A-4B, 5A-5C, and 6.

Figure 8A:
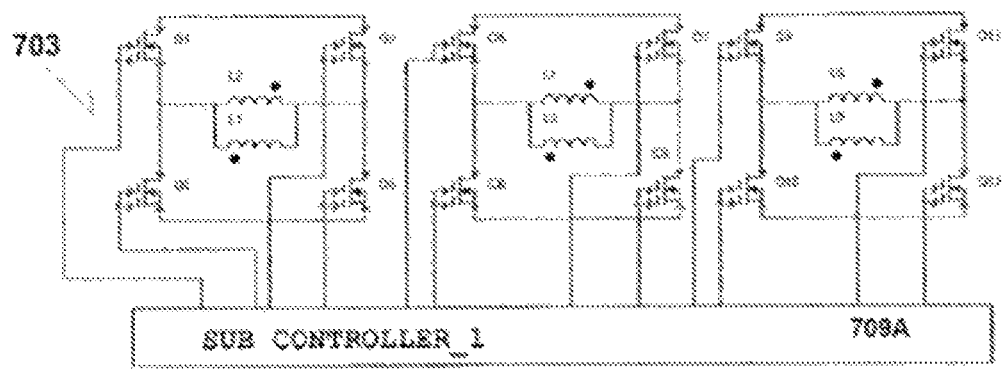
FIG. 8A illustrates a general control structure for an exemplary driving unit and exemplary starter driving unit for the motor of the present disclosure.
Figure 8B:
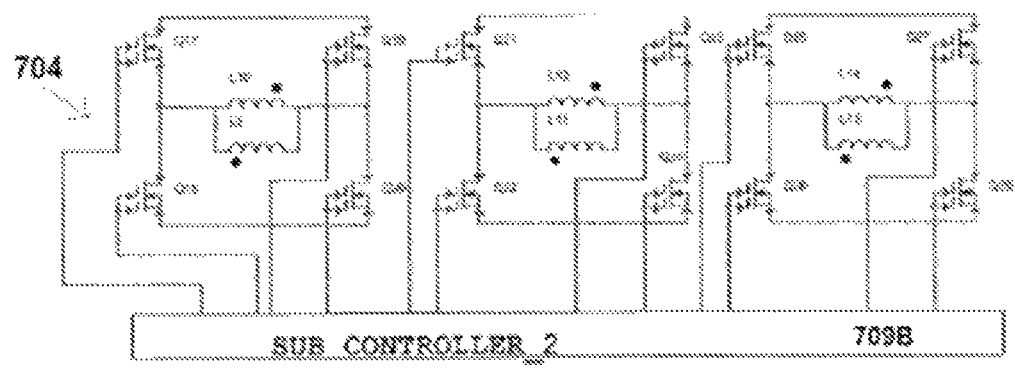
FIG. 8B illustrates exemplary driving signals directed to the main solenoids and the starter solenoids of an exemplary embodiment of the present disclosure.

Referring now to FIGS. 8A and 8B, an exemplary structure of driving unit 703 is presented, along with starter solenoids driving unit 704. In this example, it is assumed in FIG. 8A that six (6) main solenoids (e.g., 312 in FIG. 6) are employed, and in FIG. 8B that six starter solenoids (e.g., 612 in FIG. 6) are employed. The diagram associated with "SUB CONTROLLER_1" 709A illustrates an exemplary structure of the main solenoids driving unit 703. The diagram associated with "SUB CONTROLER_2" 709B illustrates an exemplary structure of the starter solenoids driving unit 704. In some embodiments, each pair of adjacent solenoids may be driven via a single circuitry, though any operable circuitry may be employed as desired. With a single circuitry, however, three such circuitries may be provided in FIG. 8A for the main solenoids (i.e., "SUB CONTROLLER_1", 709A), and separately for the starter solenoids (i.e., "SUB CONTROLLER_2", 709B) in FIG. 8B.

Figure 8C:
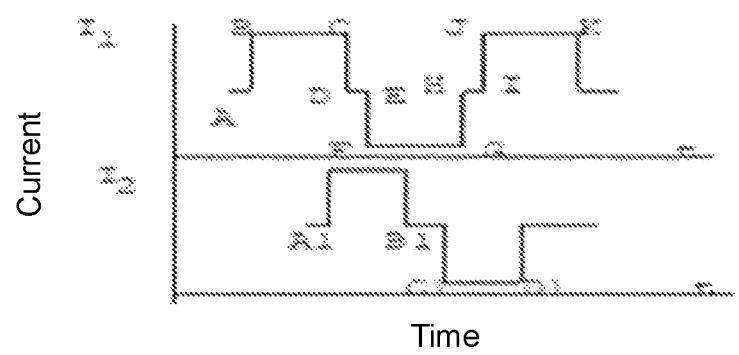
FIG. 8C illustrates a Current versus Time Plot for Periods A-K.

As shown in FIG. 8A, for example, the winding direction in the adjacent solenoids of each pair is opposite one with respect to the other. With respect to the main solenoids, initially, the pairs of switches Q1;Q4, Q5;Q8, and Q9;Q12 may be closed based on respective signals from the "SUB CONTROLLER_1" 709A, resulting in a first-direction pulse of current (e.g., period A-C in FIG. 8C) at each pair of solenoids (e.g., L1;L2, L3;L4, and L5;L6, respectively). Thereafter, and based on for example the rotor's orientation change as sensed by sensors 711-714, said switches may be opened for a short period (e.g., period D-E in FIG. 8C), enabling an internal stabilization of the energy at each of said pairs, and thereafter, switches Q3;Q2, Q7;Q6, and Q11;Q10 may be closed, resulting in a second-direction (opposite to said first direction) pulse of current (e.g., period E-G in FIG. 8C) at each of the pan of said solenoids. Thereafter, again all the switches may be opened (e.g., period H-I of FIG. 8C) to enable an internal energy stabilization at each of said pairs, and the same procedure may then repeat. The operation of the starter solenoids driving unit (FIG. 8B) may be substantially the same as of the main solenoids driving unit, mutatis mutandis. The embodiments illustrated herein with respect to FIGS. 8A-8C are applicable to the elements disclosed with respect to FIGS. 3, 4A-4B, 5A-5C, and 6.

It should be noted that there is no requirement to supply current to all the solenoids of the stator at any given time. In order to save the battery energy, and if the load from the motor is low, a supply of current to even a single main solenoid may suffice. On the other hand, if the load is very high, current may be supplied simultaneously to all the main solenoids, as well as to some or all of the starter solenoids, of course in a timely manner. The controller 709 may include a plurality of selectable modes of operation, to suit the various situations.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

That which is claimed:

1. An electric motor comprising a rotor and a stator:
   the stator comprising one or more main solenoids, each comprising a cavity;
   the rotor comprising a plurality of permanent magnets disposed in a ring-like manner, wherein similar poles of adjacent magnets face one another; and further comprising a gear mechanism for interfacing with an axle gear mechanism;
   a bearing assembly comprising an inner and outer ring with one or more bearings disposed therebetween, wherein the inner ring is stationary and the outer ring is movable relative to the inner ring, and further wherein the outer ring comprises the gear mechanism for interfacing with the axle gear mechanism;
   wherein the permanent magnets are arranged to pass through the cavities of the main solenoids.

2. The electric motor of claim 1, further comprising air spaces in regions between ends of each pair of adjacent magnets, and each of said permanent magnets is narrowed at its end in a form of a truncated pyramid or cone to cause concentration of the magnetic field at each of said regions, respectively.

3. The electric motor of claim 1, wherein each of the one or more bearings has a spherical or cylindrical shape.

4. The electric motor of claim 1, wherein the one or more bearings comprise ball bearings or roller bearings.

5. The electric motor of claim 1, further comprising one or more starter solenoids.

6. The electric motor of claim 5, wherein the one or more starter solenoids are disposed between each pair of main solenoids.

7. The electric motor of claim 5, wherein rotation of the rotor induces electrical currents in the one or more starter solenoids.

8. The electric motor of claim 7 wherein the one or more starter solenoids may be selectively disengaged from the system such that electrical currents are not induced in the one or more starter solenoids.

9. The electrical motor of claim 5, wherein a physical width of the one or more starter solenoids is less than the one or more main solenoids.

10. The electrical motor of claim 5, wherein the one or more starter solenoids each have more windings relative to the one or more main solenoids.

11. The electric motor of claim 1, wherein the outer ring passes through cavities of the main solenoids.

\* \* \* \* \*